US008407795B2

(12) United States Patent
Palagummi

(10) Patent No.: US 8,407,795 B2
(45) Date of Patent: Mar. 26, 2013

(54) SYSTEMS AND METHODS TO SECURE BACKUP IMAGES FROM VIRUSES

(75) Inventor: Siva Sai Prasad Palagummi, Hyderabad (IN)

(73) Assignee: CA, Inc., Islandia, NY (US)

( * ) Notice: Subject to any disclaimer, the term of this patent is extended or adjusted under 35 U.S.C. 154(b) by 235 days.

(21) Appl. No.: 12/782,263

(22) Filed: May 18, 2010

(65) Prior Publication Data

US 2011/0289584 A1  Nov. 24, 2011

(51) Int. Cl.
*G06F 11/00* (2006.01)
(52) U.S. Cl. .......................................................... 726/24
(58) Field of Classification Search .................. None
See application file for complete search history.

(56) References Cited

U.S. PATENT DOCUMENTS

| | | | |
|---|---|---|---|
| 5,948,104 A * | 9/1999 | Gluck et al. ................... 726/24 |
| 7,707,184 B1 | 4/2010 | Zhang et al. |
| 7,907,565 B2 * | 3/2011 | Van de Groenendaal et al. ............................. 370/329 |
| 2004/0003266 A1 | 1/2004 | Moshir et al. |
| 2004/0005873 A1 * | 1/2004 | Groenendael et al. ........ 455/410 |
| 2006/0004868 A1 | 1/2006 | Claudatos et al. |
| 2006/0047930 A1 | 3/2006 | Takahashi et al. |
| 2007/0283438 A1 * | 12/2007 | Fries et al. ...................... 726/24 |
| 2010/0132022 A1 * | 5/2010 | Venkatasubramanian ........ 726/7 |
| 2011/0107043 A1 | 5/2011 | Palagummi |
| 2011/0289057 A1 | 11/2011 | Palagummi |

OTHER PUBLICATIONS

U.S. Appl. No. 12/609,170, Final Office Action mailed May 29, 2012, 19 pgs.
U.S. Appl. No. 12/609,170, Non Final Office Action mailed Feb. 2, 2012, 18 pgs.
U.S. Appl. No. 12/609,170, Response filed May 2, 2012 to Non Final Office Action mailed Feb. 2, 2012, 13 pgs.
U.S. Appl. No. 12/782,318, Final Office Action mailed May 11, 2012, 12 pgs.
U.S. Appl. No. 12/782,318, Non Final Office Action Mailed Jan. 20, 2012, 11 pgs.
U.S. Appl. No. 12/782,318, Response filed Apr. 16, 2012 to Non Final Office Action mailed Jan. 20, 2012, 12 pgs.
Tanenbaum, Andrew S, et al., "Distributed Systems Principles and Paradigms", Prentice Hall, Inc, (2002), 422-425.

* cited by examiner

*Primary Examiner* — Kambiz Zand
*Assistant Examiner* — Teshome Hailu
(74) *Attorney, Agent, or Firm* — Schwegman Lundberg & Woessner, P.A.

(57) ABSTRACT

A system and method provide for storing virus metadata with a backup image. Upon restoring files or data from the backup image, the virus metadata from the backup image is compared with current virus data. The comparison yields a list of new viruses that have been discovered after the backup image was created. The restore process may cause restored files to be scanned for the new viruses, while excluding previously known viruses from the scan.

18 Claims, 7 Drawing Sheets

SYSTEMS AND METHODS TO SECURE BACKUP IMAGES FROM VIRUSES

FIELD OF THE INVENTION

The present disclosure relates to computer system backups and recovery, and in various embodiments, scanning a backup image for new viruses discovered after the backup image was made.

BACKGROUND

Virtually any non-trivial computer system includes a data backup and data recovery sub-system. Backups serve many purposes, including file restoration in the event of accidental deletion or corruption, or for disaster recovery or compliance purposes. Unfortunately, computer systems are also the target of viruses or other malware. Such viruses and malware can cause disruption in the functioning of the system, or can steal information from the system. Virus scanners operate to detect viruses using signatures. Such signatures can comprise data patterns that indicate a virus may be present in a file. Typically, the data included in a backup will have been scanned for the viruses known at the time of the backup. However, new viruses are constantly being developed.

DETAILED DESCRIPTION

Figure 1:
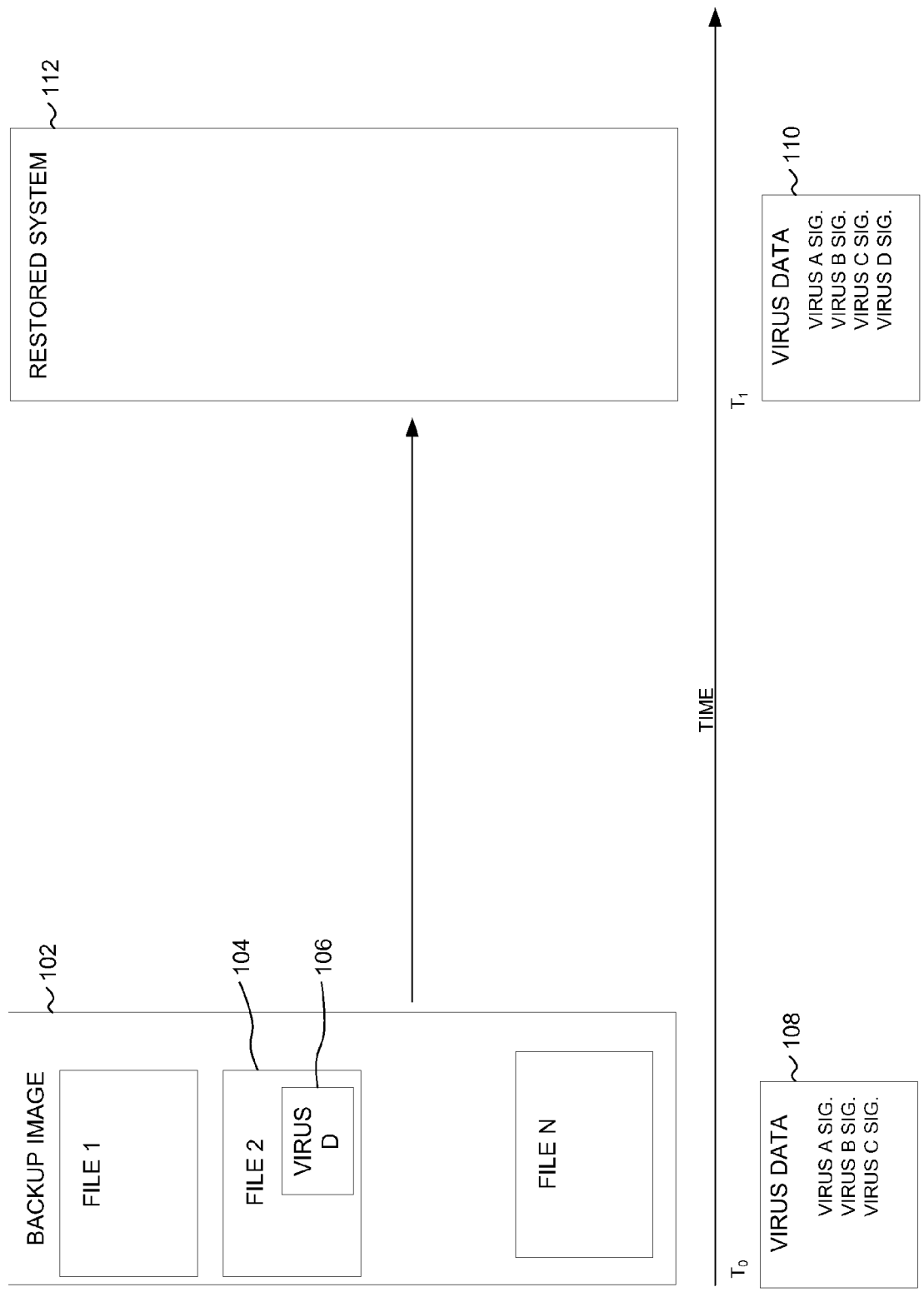
FIG. 1 illustrates a backup and recovery timeline in which embodiments of the invention may operate.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 illustrates an example backup and recovery timeline in which embodiments of the invention may operate. In the example shown, a backup image 102 is created at a particular point in time (labeled $T_o$ on the timeline). Backup image 102 may comprise an image on a disk, including disks that reside on network attached storage, or the backup image may reside on removable media such as DVD-ROMs, CD-ROM, flash memory etc. The backup image may be stored onsite, that is, stored on or near the system that is backed up, or the backup image may be stored offsite, that is, remote from the system being backed up. The backup image may comprise all files and data on a computer system or some desired subset of files and/or data. Also at time $T_0$, the system may have a virus scanning module that uses virus data 108 to determine whether files in the system are infected with a virus or other malware. In this simplified example, at time $T_0$, the virus data includes signatures that may be used to identify viruses A, B and C. However, as indicated in the example, one of the files in the backup image, file 104, has a virus D, which is not included in the virus data and which is therefore undetectable by the virus scanner at $T_0$, the time the backup image is created. The situation can occur in various ways. For example, it takes time for a new introduced virus to become noticed by system users, and it further takes time for the developers of antivirus software to develop virus scanners or virus data that allows for the detection of a new virus. Further, there may be system constraints on when new virus data can be installed on systems. As a result, there is often a time lag between when a new virus is first discovered to when antivirus software and data can be adapted to detect the new virus.

Later, at time $T_1$, the backup image may be used to restore one or more files to a restored system 112. For example, in some cases a user may have corrupted one or more files and require files from the backup image to restore the files to a known good condition. In other cases, a system failure may require a complete restoring of all files from a backup image so that the restored system assumes the functioning of the old system, for example, in a disaster recovery scenario. At time $T_1$, the current virus data 110 may be able to detect virus D.

It should be noted that the source system from which the backup image was made and restored system 112 may be the same system. Further, either or both of the source system from which backup image was made and restored system 112 may reside on physical hardware or may be part of a virtual machine which emulates physical hardware.

Figure 2A:
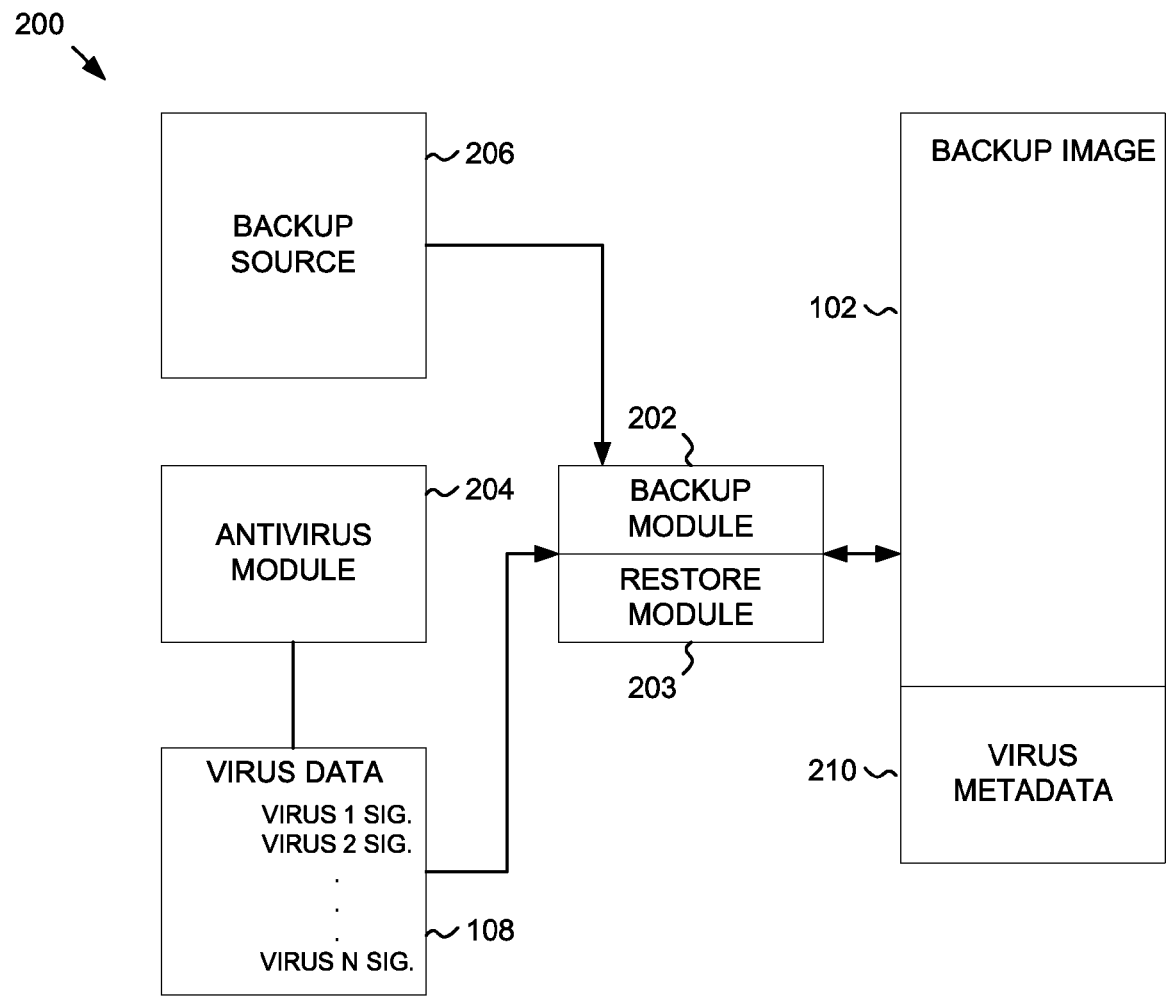
FIGS. 2A and 2B are block diagrams of backup and restore systems according to embodiments of the invention.

FIG. 2A is a block diagram of a backup and restore system 200 according to embodiments of the invention. System 200 may include in various embodiments a backup module 202, a restore module 203, and an antivirus module 204. As used herein, a module is any grouping of software, hardware, or firmware routines that perform an indicated task. Backup module 202 receives files and data from a backup source 206 and places the files and data in backup image 102. The backup source may be any source that can be used to persistently store data such as hard drives, DVD-ROMs, CD-ROMs, flash memories or any other persistent storage device. The backup source may include more than one persistent storage device. In addition, the files and data to be backed up may include one, some, or all of the files and data from a backup source.

Restore module 203 restores files and data from a backup image 102 to a desired target. The desired target may be the same persistent storage that was the source of the backup image. For example, a user may have either accidentally deleted or corrupted one or more files. The backup image can be used to restore the files to their state as of the time the backup image was made. The desired target may be persistent storage on another system such that the other system has a copy of the files and data.

Although shown and numbered as separate modules, backup module 202 and restore module 203 may be part of a single software executable, or separate executables that are part of a package. The inventive subject matter is not limited by how the backup and restore modules are organized.

Antivirus module 204 is used to detect and viruses and other malware in files and data. The antivirus module may detect viruses on-demand, that is, when a file is accessed or loaded. Further, the antivirus module may detect viruses as a result of a scan of one or more files and/or data on persistent storage. In operation, antivirus module 204 uses virus data 108 as part of the virus detection process. As discussed above, virus data 108 typically includes information identifying viruses, including virus signatures and virus names.

In some embodiments, during backup operations, backup module 202 may incorporate virus metadata with a backup image 208. The virus metadata identifies the known viruses (i.e., the viruses that were detectable by antivirus module 204) at the time the backup image was created. The virus metadata may take various forms in various embodiments. In some embodiments, the virus metadata may be a simple listing of the virus names from virus data 108. In alternative embodiments, the virus metadata may include names and signatures from virus data 108. In further alternative embodiments, the virus metadata may include a version number for the virus data and/or an antivirus engine. Other information used to detect and identify viruses may be included in virus metadata 210 and are within the scope of the inventive subject matter.

Figure 2B:
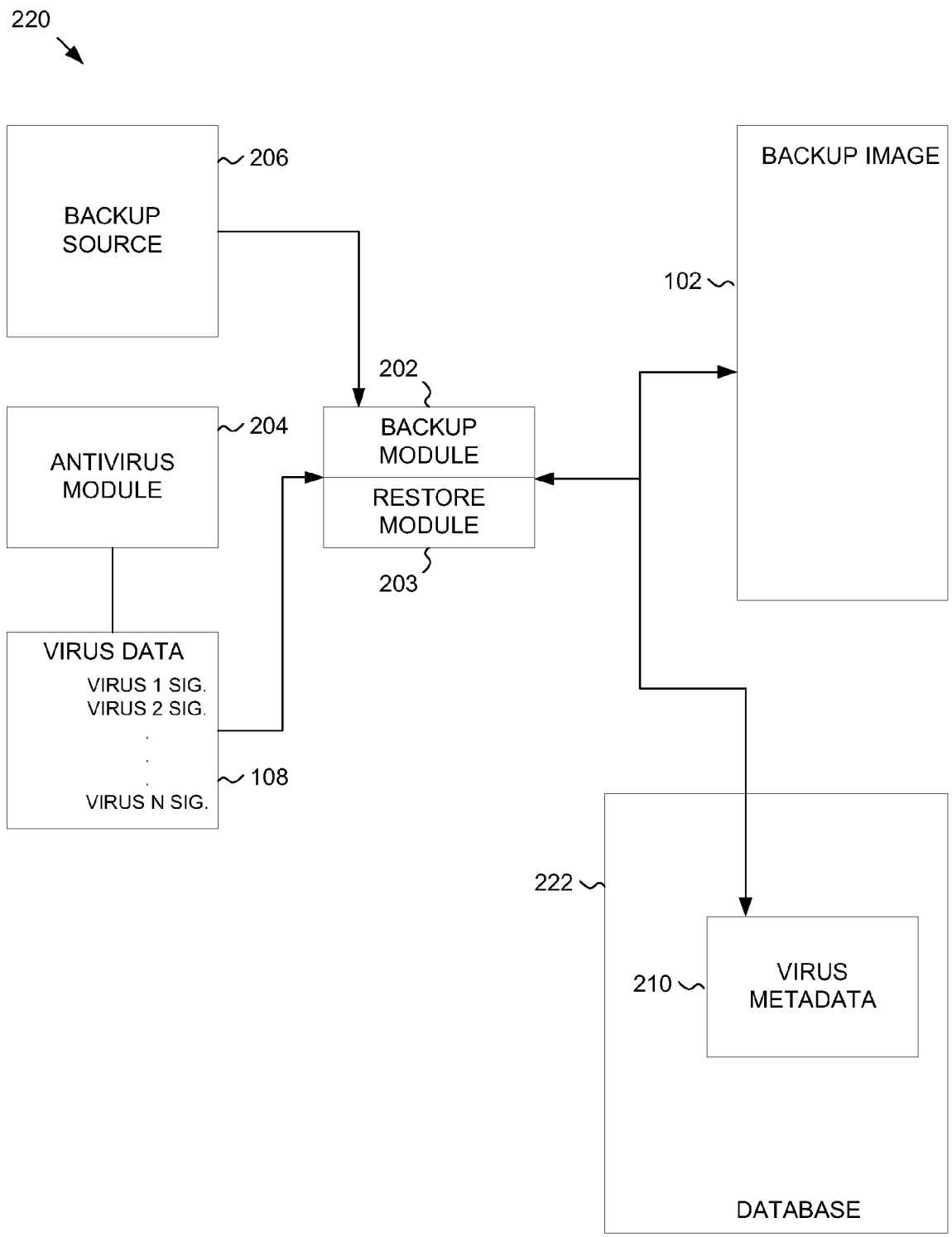

FIG. 2B is a block diagram of a backup and restore system 220 according to alternative embodiments of the invention. System 220 includes the backup, restore and antivirus modules described above with respect to FIG. 2A. In addition, system 220 includes a database 222. Database 222 may be any type of database, including relational databases, hierarchical databases, or object oriented databases. Further, database 222 may be a set of files in a file system. In some embodiments, virus metadata 210 may be placed in database 222 at the time a backup image is created. The database may include various versions of virus metadata 210, each from a different point in time that a backup operation was performed.

Figure 3:
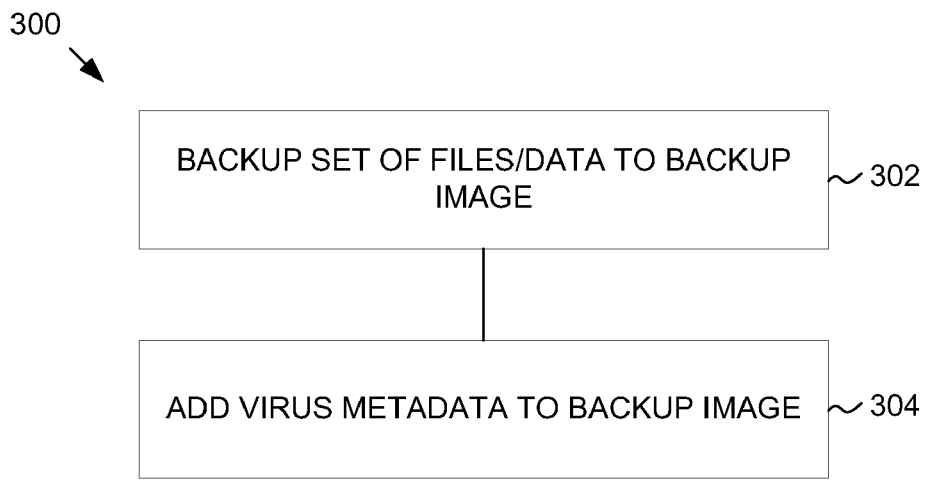
FIG. 3 is a flowchart illustrating a backup method according to an embodiment of the invention.

FIG. 3 is a flowchart illustrating a backup method 300 according to an embodiment of the invention. Method 300 begins at block 302 by backing up a set of files and/or data to a backup image. As noted above, the backup image may comprise an image on a disk, including disks that reside on network attached storage, or the backup image may reside on removable media such as DVD-ROMs, CD-ROM, flash memory etc. The backup may be in response to a user or system administrator request, or the backup may be as a result of a scheduled backup.

At block 304, a backup module 202 adds virus metadata to the backup image. The virus metadata may be added as a separate portion of the backup image, or it may be included as part of other file metadata that is part of the backup image. Further, in alternative embodiments, the virus metadata may be added to a database.

Figure 4A:
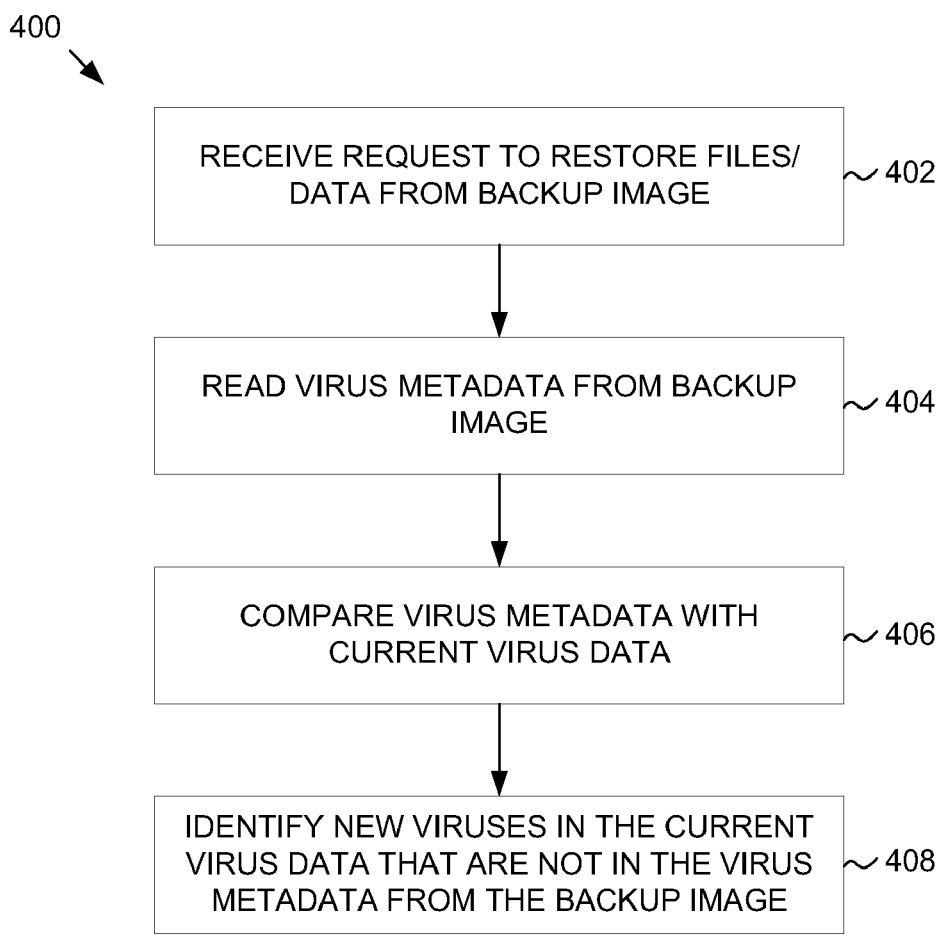
FIGS. 4A-4C are flowcharts illustrating restore methods according to embodiments of the invention.
Figure 4B:
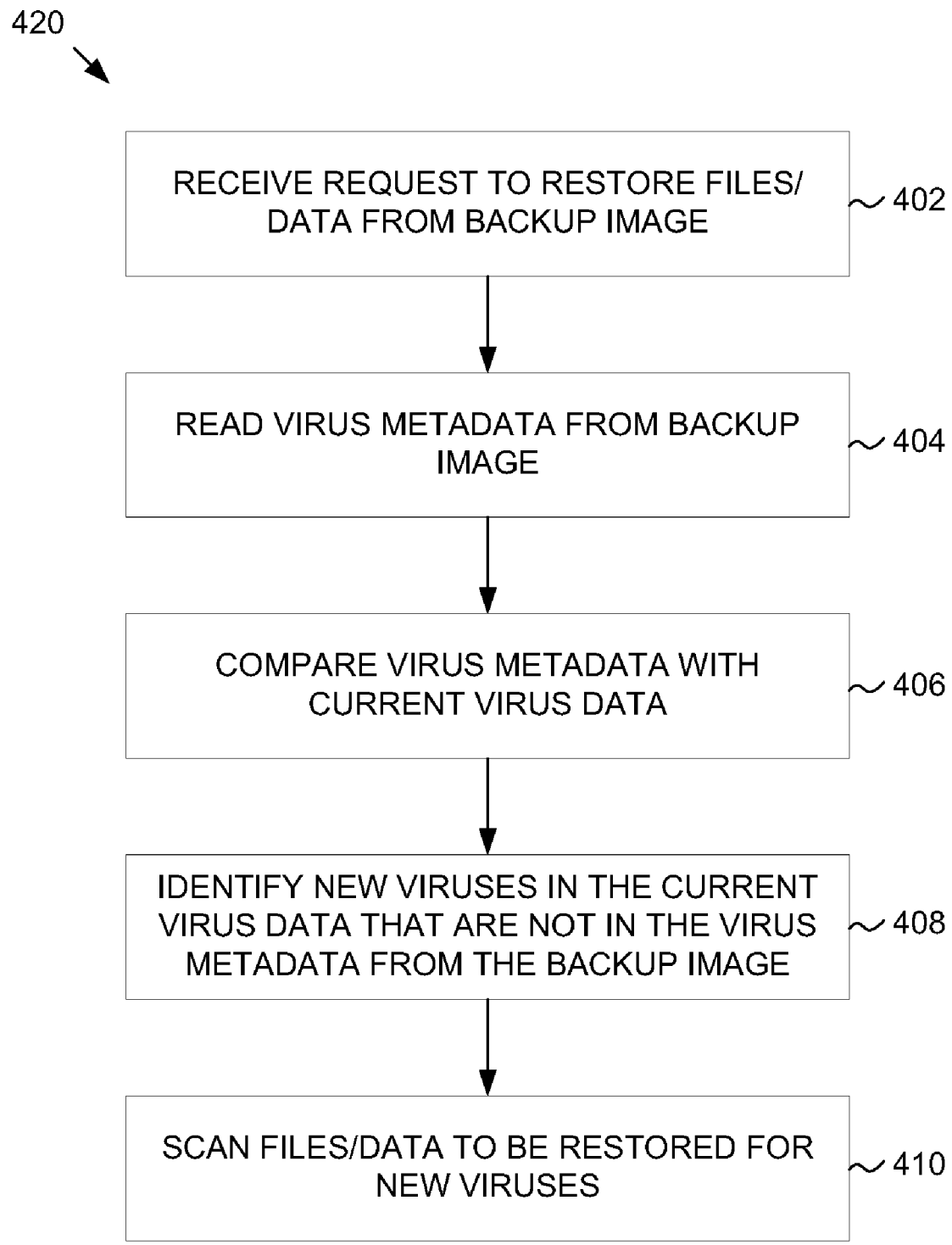
Figure 4C:
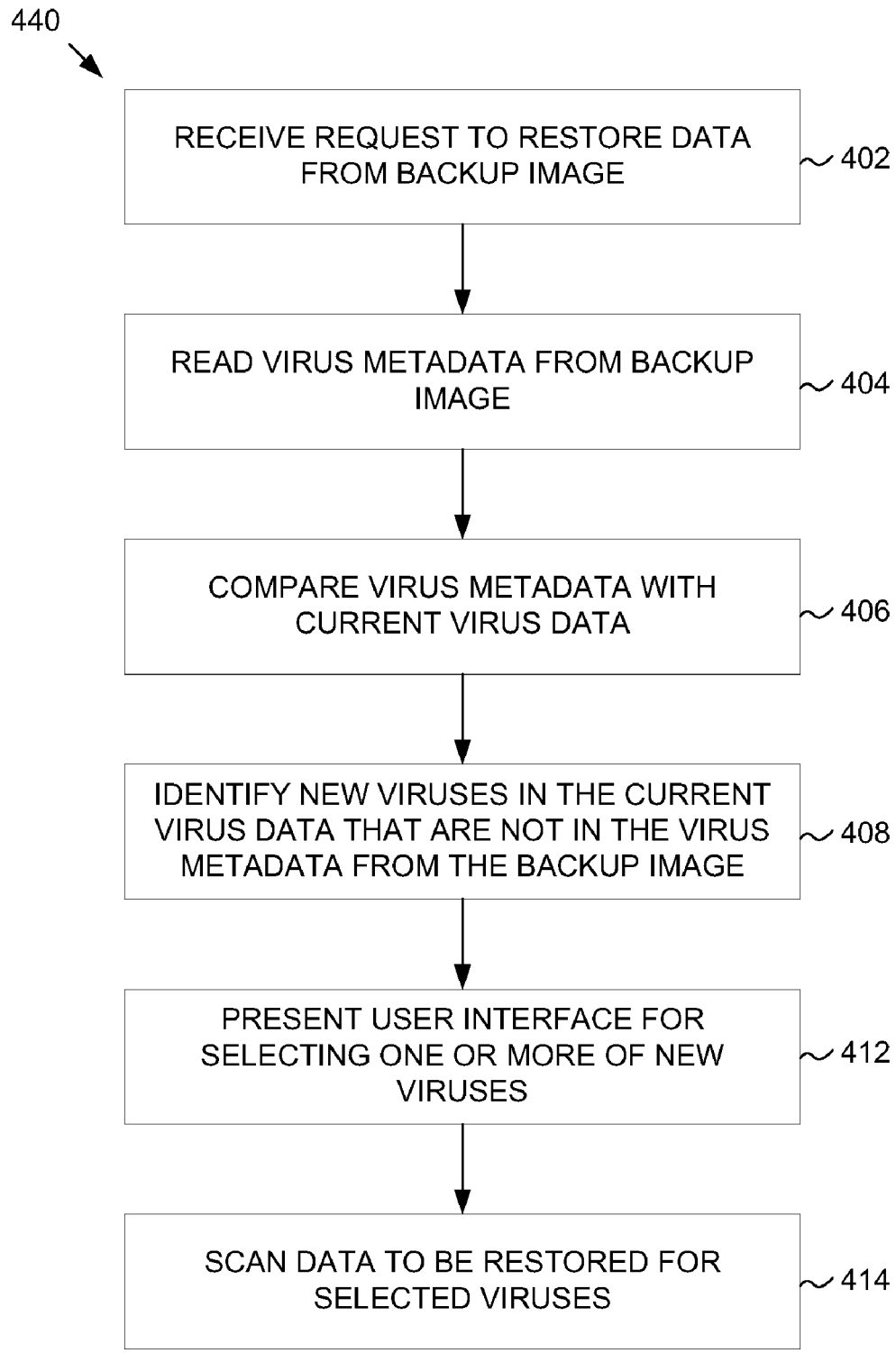

FIGS. 4A-4C are flowcharts illustrating methods according to various embodiments for recovering and restoring files from a backup image created as described above with reference to FIGS. 1-3. The methods include a number of process blocks 402-412. Though arranged serially in the example embodiments described by FIGS. 4A-4C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any method flow described herein is applicable to software, firmware, hardware, and hybrid implementations.

FIG. 4A is a flowchart illustrating a restore method 400 according to embodiments of the invention. The method begins at block 402 with receiving a request to restore files or data from a backup image. The request may be the result of a command that is provided to an operating system, as part of an action executed within a graphical user interface of a backup/restore system, or as part of a system recovery process.

At block 404, in some embodiments, a restore module reads virus metadata from the backup image. As discussed above, the virus metadata includes information about viruses known at the time the backup image was created.

In alternative embodiments, the restore module may determine the date of the backup image and read virus metadata from a database, where the virus metadata corresponds to the date the backup image was created.

At block 406, the restore module compares the virus metadata from the backup image with current virus data. In some embodiments, this comparison may involve comparing a set of virus names in the virus metadata from the backup image with a set of virus names from the current virus data. In alternative embodiments, the comparison may involve comparing virus signatures in the virus metadata from the backup image with virus signatures in the current virus data.

At block 408, the restore module uses the comparison to identify those viruses that are in the current virus data that are not in the virus metadata from the backup image. The set of viruses identified as a result of the comparison comprise "new" viruses that have been discovered and made detectable by the antivirus module in the time period after the backup image was created.

FIG. 4B is a flowchart illustrating a restore method 420 according to alternative embodiments of the invention. Blocks 402-408 of the method have been described above with reference to FIG. 4A. At block 410, the files and/or data to be restored are scanned for the new viruses that are in the current virus data, but are not in the virus metadata associated with the backup image. In some embodiments, the files and/or data are scanned only for the new viruses, thereby excluding scanning for viruses that were known at the time of the backup. In some embodiments, the files and or data are scanned prior to restoring the files to a target storage medium. In alternative embodiments, the files and/or data are scanned after they have been restored to the target storage medium.

FIG. 4C is a flowchart illustrating restore method 440 according to further alternative embodiments of the invention. Blocks 402-408 of the method have been described above with reference to FIG. 4A. At block 412 the restore module presents a user interface for selecting one or more of the new viruses. For example, a list of the names of the new viruses may be displayed on the user interface. In addition to the names, some embodiments will display a threat level associated with the listed virus. The threat level may be obtained from the current virus data, or it may be obtained from another source such as a web site maintained by antivirus software vendors. A user may use the user interface to select from the listed new viruses one or more viruses. In some embodiments, selecting a virus from the list indicates that the virus is to be scanned for prior to restoring the file/data to a target storage media, while non-selection means the virus may be scanned for after the file/data is restored. In alternative embodiments, a user may select viruses to be scanned for after the files/data are restored while non-selection of viruses in the list indicates that user desires scanning prior to restoring the file or data.

At block 414 the restore process causes the files to be restored to be scanned for the new viruses selected through the user interface. Viruses that are not "new", i.e., those that were known at the time the backup image was created, are indicated by their presence in the virus metadata associated with the backup, are excluded from the scan for new viruses. As noted above, the files and/or data to be restored may be scanned before they are restored to a target media or after they have been restored to the target media.

It should be noted while the systems and methods above have been discussed in the context of restoring files and/or data from a backup image, the systems and methods may be applied at other points in the life of a backup image. For example, in some embodiments, a backup image may be scanned for viruses prior to any requests for restoring files or data from the backup image. In these embodiments, the virus metadata associated with the backup image may be compared to current virus data, and the scan of the backup image may be performed with respect to any new viruses that are in the current virus data but not in the virus metadata associated with the backup image. In some embodiments, the system may "cure" the backup image of the virus by either removing the virus or quarantining the file containing the virus. The cure may be provided to the backup image, or a cured copy of the backup image can be created. In some embodiments, the user is given the option of whether to cure viruses found during the scan or whether the backup image should be marked as containing the virus. After the scan of the backup image has been completed, the virus metadata associated with the backup image may be updated to include the new viruses from the current virus data. This allows future scans to exclude the new viruses.

Additionally, it may be the case that copies of backup images are maintained both onsite and offsite. In some embodiments that scan backup images in the manner described above, if a virus is found in the onsite copy of a backup image, then the backup/restore software will save data indicating that the offsite copy of the backup should be scanned for the viruses found during the scan of the onsite copy.

Figure 5:
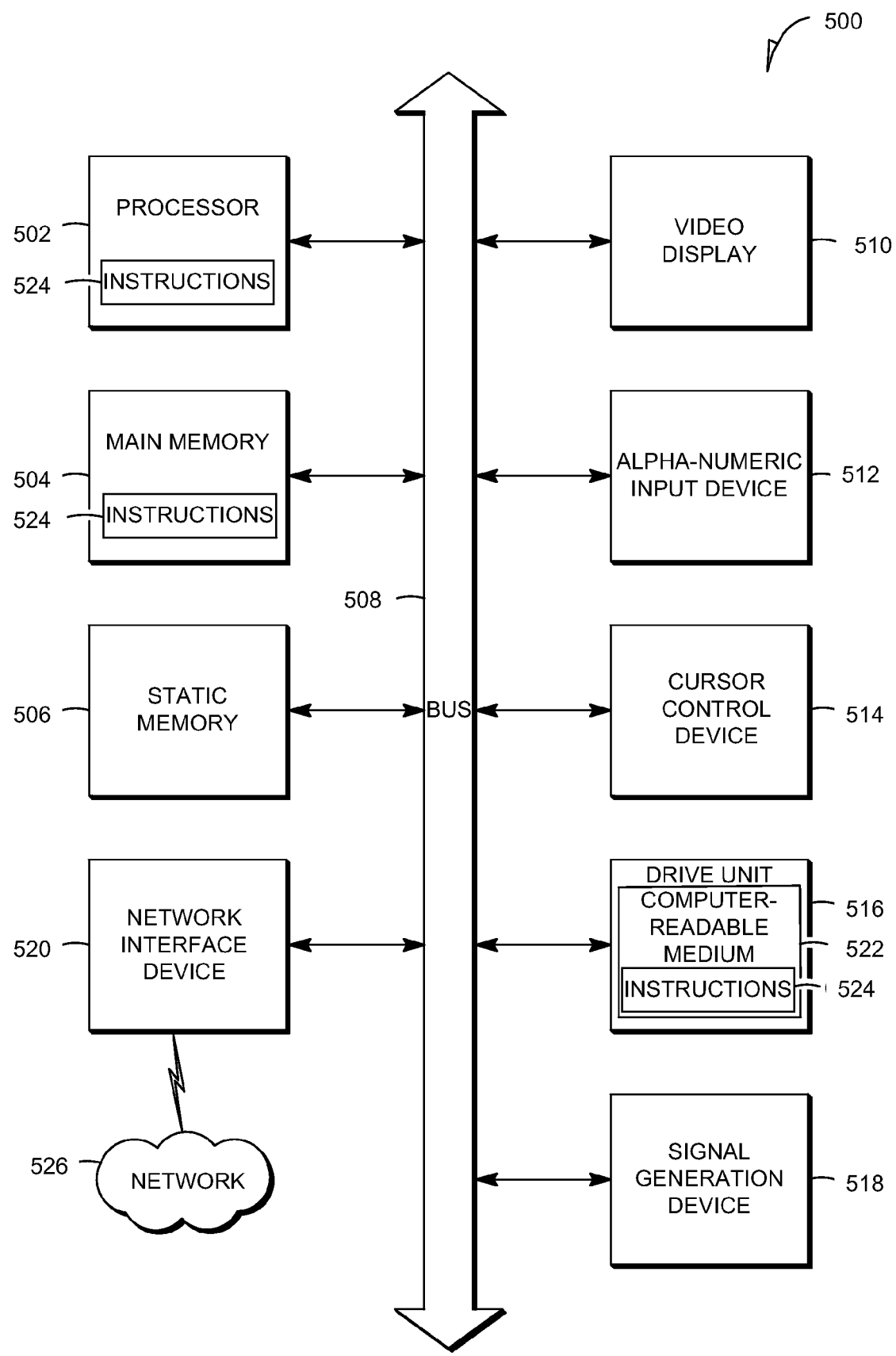
FIG. 5 is a block diagram of an example embodiment of a computer system upon which embodiments inventive subject matter can execute.

FIG. 5 is a block diagram of an example embodiment of a computer system upon which embodiments of the inventive subject matter can execute. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

As noted above, the backup and recovery system as disclosed herein can be spread across many physical hosts. Therefore, many systems and sub-systems of FIG. 5 can be involved in such a backup and recovery system.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to both servers and/or remote clients.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alphanumeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, an example system, method and machine readable medium for a backup and restore system that compares virus data and scans restored files for newly discovered viruses have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A method for execution by one or more computer processors, the method comprising:
   receiving at the one or more computer processors a request to restore data from a backup image;
   reading first virus data from a storage device, the first virus data indicating viruses already scanned for at a time the backup image was created;
   comparing by the one or more computer processors the first virus data with current virus data;
   identifying, based on the comparing, one or more viruses in the current virus data and not in the first virus data; and
   scanning data to be restored from the backup image for the one or more viruses in the current virus data and not in the first virus data wherein the scanning does not include viruses already scanned for in the first virus data.

2. The method of claim 1, and further comprising:
   restoring the data to a storage medium; and
   scanning the data on the storage medium for the one or more viruses in the current virus data and not in the first virus data.

3. The method of claim 1, and further comprising:
   presenting a user interface for selecting a subset of the one or more viruses;
   receiving a selection from the user interface; and
   scanning data to be restored for the one or more viruses in the current virus data and not in the first virus data in accordance with the selection.

4. The method of claim 3, and further comprising presenting on the user interface a severity level of the one or more viruses.

5. The method of claim 1, wherein the first virus data is stored with the backup image.

6. The method of claim 1, wherein the first virus data is stored separately from the backup image.

7. A system comprising:
   one or more computer processors;
   a backup image stored on a computer readable storage device; and
   a restore module executable by the one or more processors to perform the actions of:
      receive a request to restore data from the backup image,
      read first virus data, the first virus data indicating viruses already scanned for at a time the backup image was created, compare the first virus data with current virus data,
identify, based on the compare, one or more viruses in the current virus data and not in the first virus data; and
scan data to be restored for the one or more viruses in the current virus data and not in the first virus data wherein the scanning does not include viruses already scanned for in the first virus data.

8. The system of claim 7, further comprising a storage medium and wherein the restore module further performs the actions of:
restore the data to the storage medium; and
scan the data on the storage medium for the one or more viruses in the current virus data and not in the first virus data.

9. The system of claim 7, wherein the restore module further performs the actions of:
present a user interface for selecting a subset of the one or more viruses;
receive a selection from the user interface; and
scan data to be restored for the one or more viruses in the current virus data and not in the first virus data in accordance with the selection.

10. The system of claim 7, wherein the results of the comparison include a severity level of the one or more viruses.

11. The system of claim 7, wherein the first virus data is stored with the backup image.

12. The system of claim 7, wherein the first virus data is stored separately from the backup image.

13. A computer readable storage device having stored thereon instructions that when executed by one or more processors, performs operations comprising:
receiving a request to restore data from a backup image;
reading first virus data, the first virus data indicating viruses already scanned for at a time the backup image was created;
comparing by the one or more processors the first virus data with current virus data;
identifying, based on the comparing, one or more viruses in the current virus data and not in the first virus data; and
scanning data to be restored from the backup image for the one or more viruses in the current virus data and not in the first virus data wherein the scanning does not include viruses already scanned for in the first virus data.

14. The computer readable storage device of claim 13, wherein the operations further include:
restoring the data to a storage device; and
scanning the data on the storage device for the one or more viruses in the current virus data and not in the first virus data.

15. The computer readable storage device of claim 13, wherein the operations further include:
presenting a user interface for selecting a subset of the one or more viruses;
receiving a selection from the user interface; and
scanning data to be restored for the one or more viruses in the current virus data and not in the first virus data in accordance with the selection.

16. The computer readable storage device of claim 15, wherein the operations further include presenting on the user interface a severity level of the one or more viruses.

17. The computer readable storage device of claim 13, wherein the first virus data is stored with the backup image.

18. The computer readable storage device of claim 13, wherein the first virus data is stored separately from the backup image.

* * * * *